United States Patent [19]

Nakane et al.

[11] Patent Number: 4,500,864
[45] Date of Patent: Feb. 19, 1985

[54] PRESSURE SENSOR

[75] Inventors: Takeshi Nakane, Okazaki; Katsumi Nakagawa, Kariya, both of Japan

[73] Assignee: Aisin Seiki Kabushiki Kaisha, Kariya, Japan

[21] Appl. No.: 511,029

[22] Filed: Jul. 5, 1983

[30] Foreign Application Priority Data

Jul. 5, 1982 [JP] Japan .................. 57-116423

[51] Int. Cl.³ .............................. G01L 1/22
[52] U.S. Cl. ........................... 338/4; 338/42; 73/720; 73/726
[58] Field of Search .................... 338/2-4, 338/42; 73/719-721, 725-727; 29/610 SG

[56] References Cited

U.S. PATENT DOCUMENTS

| 3,235,826 | 3/1964 | Crites | 338/4 |
| 3,289,134 | 11/1966 | Laimins et al. | 338/4 |
| 3,395,089 | 7/1968 | Mayer et al. | 29/620 |
| 3,899,766 | 7/1975 | Mermelstein | 338/4 X |
| 4,100,524 | 7/1978 | Kirsch | 338/5 X |
| 4,104,605 | 8/1978 | Boudreaux et al. | 338/2 |
| 4,298,505 | 11/1981 | Dorfeld et al. | 338/308 X |
| 4,325,048 | 4/1982 | Zaghi et al. | 338/3 |
| 4,382,247 | 5/1983 | Stecher et al. | 338/42 |

FOREIGN PATENT DOCUMENTS 2614775 10/1977 Fed. Rep. of Germany ... 29/610 SG
506066 5/1976 U.S.S.R. .................. 338/4

OTHER PUBLICATIONS

Borshchevskii et al., "Method of Designing Diaphragm-Type Tensoresistors Pressure Transducers", Measurement Techniques, vol. 19, No. 7, Jul. 1976, pp. 991-994.
Cattaneo, "The Industrial Applications of the Piezoresistive Effect: A Low Cost Thick Film Pressure Sensor", Conference Proceedings of 30th Electronic Components Conference, San Francisco, CA, USA (Apr. 28-30, 1980), pp. 429-435.

Primary Examiner—Roy N. Envall, Jr.
Assistant Examiner—C. N. Sears
Attorney, Agent, or Firm—Sughrue, Mion, Zinn, Macpeak & Seas

[57] ABSTRACT

A pressure sensor converts fluid pressures into electrical signals by the deformation of a diaphragm. The pressure sensor is comprised of a strain gauge which includes resistance body of amorphous metal material which may be formed directly on the diaphragm by means of a physical vapor deposition process.

6 Claims, 5 Drawing Figures

FIG. 1
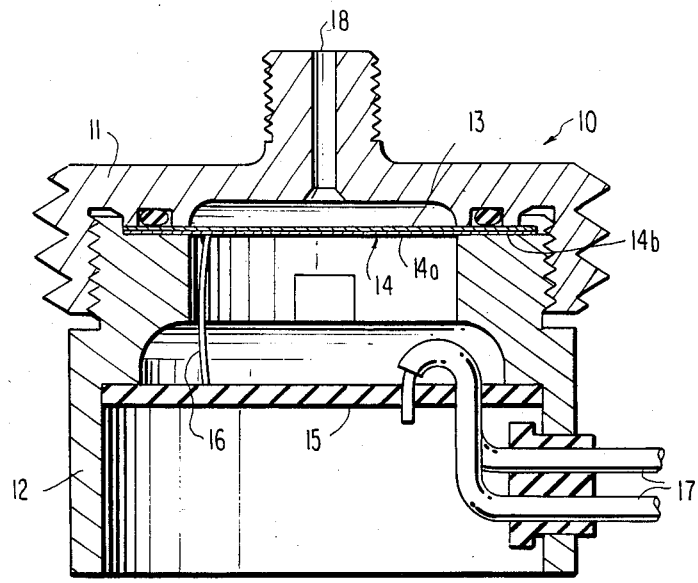
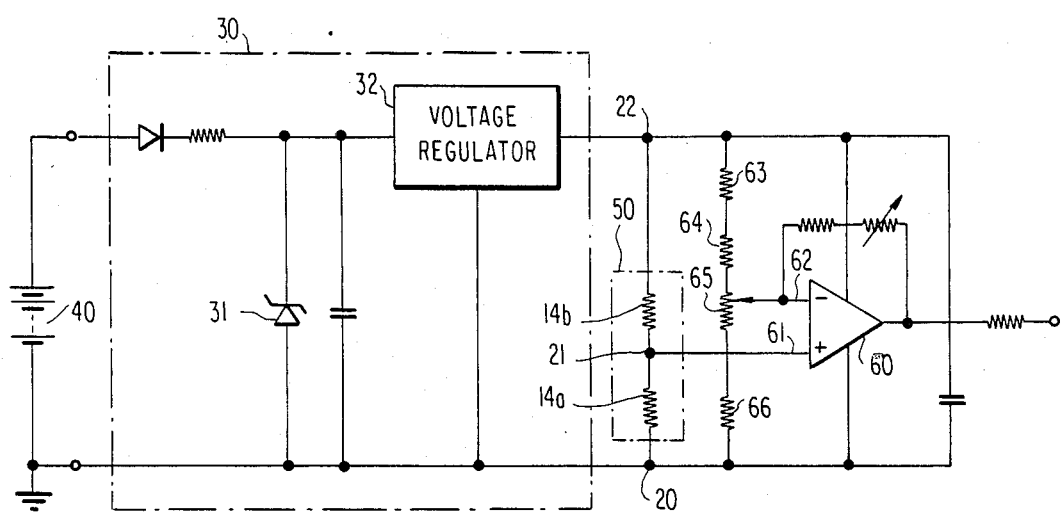
FIG. 3

PRESSURE SENSOR

BACKGROUND OF THE INVENTION

The present invention is directed to a pressure sensor for converting fluid pressures into electric signals and more particularly to a pressure sensor which detects fluid pressures by means of a diaphragm and converts distortions of the diaphragm into electric signals.

This type of pressure sensor generally detects changes in fluid pressure by means of distortions of a diaphragm and generates output signals by means of a strain gauge attached to the diaphragm. In such a pressure sensor, a metal resistance wire such as a nickel-copper wire, a semi-conductor of the piezo-resistance type, or a semi-conductor of the fusion type has been used as the strain gauge. In a strain gauge of the metal resistance type, where the temperature stability will be high, the output voltage will be very small, for example, under 8 mV, the maximum use temperature will be low, for example, on the order of 80° C., and the metal resistance wire is liable to be destroyed due to excessive distortion since its resistance to tension is low. In a strain gauge of the semi-conductor type where the sensibility or rate of the gauge tends to be high, the temperature stability will be low, for example, above 0.1 percent FS/degrees centigrade where FS represents full scale, the maximum use temperature will be low, for example, 100° C., and, it is necessary to take measures for protecting the semi-conductor since the semi-conductor is weak with respect to impulsive forces. Furthermore, such a strain gauge is insulated from the diaphragm by an insulator and is attached to the diaphragm. The strain gauge is generally adhered to the diaphragm by means of adhesive, but the characteristics of the sensors will be varied due to the varying of the adhesive property between the strain gauge and the diaphragm and the characteristics of the sensors will deteriorate as the adhesive ages. Accordingly, the application scope of such a gauge will be rather limited due to the above-mentioned characteristics of the strain gauge.

SUMMARY OF THE INVENTION

The present invention provides a new and improved pressure sensor which eliminates all of the above-mentioned drawbacks related to prior art sensors.

The present invention provides a new and improved pressure sensor which is capable of wide application and which is easy to use.

The present invention provides a new and improved pressure sensor which is simple in construction, economical to manufacture and highly reliable in operation.

The present invention provides a new and improved pressure sensor which utilizes an amorphous metal material for the strain gauge which is formed on a diaphragm by means of a physical vapor deposition (PVD) process where PVD is a general term for evaporating, sputtering and ion-plating. By means of the above-mentioned construction the pressures on the diaphragm can be converted into electric signals representative of changes in the resistance value of the strain gauge of amorphous metal material. By using the PVD process for applying the amorphous metal material, it is possible to position the strain gauge directly on the diaphragm without the use of adhesives. In this way the contact between the strain gauge and the diaphragm is uniform, thereby minimizing the variations over the surface of the strain gauge and minimizing any changes which might take place with the passage of time. Since the strain gauge is positioned directly on the diaphragm, the diaphragm can transmit a strain which appears on the diaphragm to the strain gauge correctly and reliably. Furthermore, such a strain gauge can be mass produced as compared with a conventional adhesively secured strain gauge. It is also possible to minimize the coefficient in temperature of the metal resistance (TCR), for example, under 5 ppm/°C., by means of a sputtering process and applying the amorphous metal material in a very well controlled manner. Thus, the stability of the strain gauge at various temperatures will be very high.

Amorphous metal material has the following characteristics:

(1) The change in electrical systems corresponding to changes in fluid pressure is linear and there is little hysteresis to increasing and decreasing pressures.

(2) The maximum saturated value of the changing rate of the electrical resistance is high, on the order of 5-6 percent. Since the resistivity of the amorphous metal is several times higher than that of a crystalline material such as 160–190 $\mu\Omega$cm, the absolute value change in the resistance relative to the stress is relatively high.

(3) The reliability with respect to excessive stress is high due to the strong resilient body, the maximum tension resistance of which is very high, on the order of 200–400 kg/mm$^2$.

(4) Since the temperature of crystallization is high, on the order of 500° C., the maximum use temperature is also high, on the order of 200° C.

(5) Since a plate having the shape of a thin band, for example, having a width of 20 $\mu$m, and a thickness of 30 $\mu$m, can be obtained with ease, the design of the strain gauge can be made with ease. In particular, the amorphous metal into which small quantities of chromium are added, has a high rate of resilient distortion and has superior corrosion resistance.

Thus, since the amorphous metal material is used to detect the deformation of the diaphragm, it is possible to provide a pressure sensor which is capable of use in a wide number of applications.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 1 is a vertical sectional view of a pressure sensor in accordance with one embodiment of the present invention.

FIG. 3 is a circuit diagram for measuring electrical characteristics of the strain gauge as shown in FIG. 2.

DETAILED DESCRIPTION OF THE INVENTION

Figure 2:
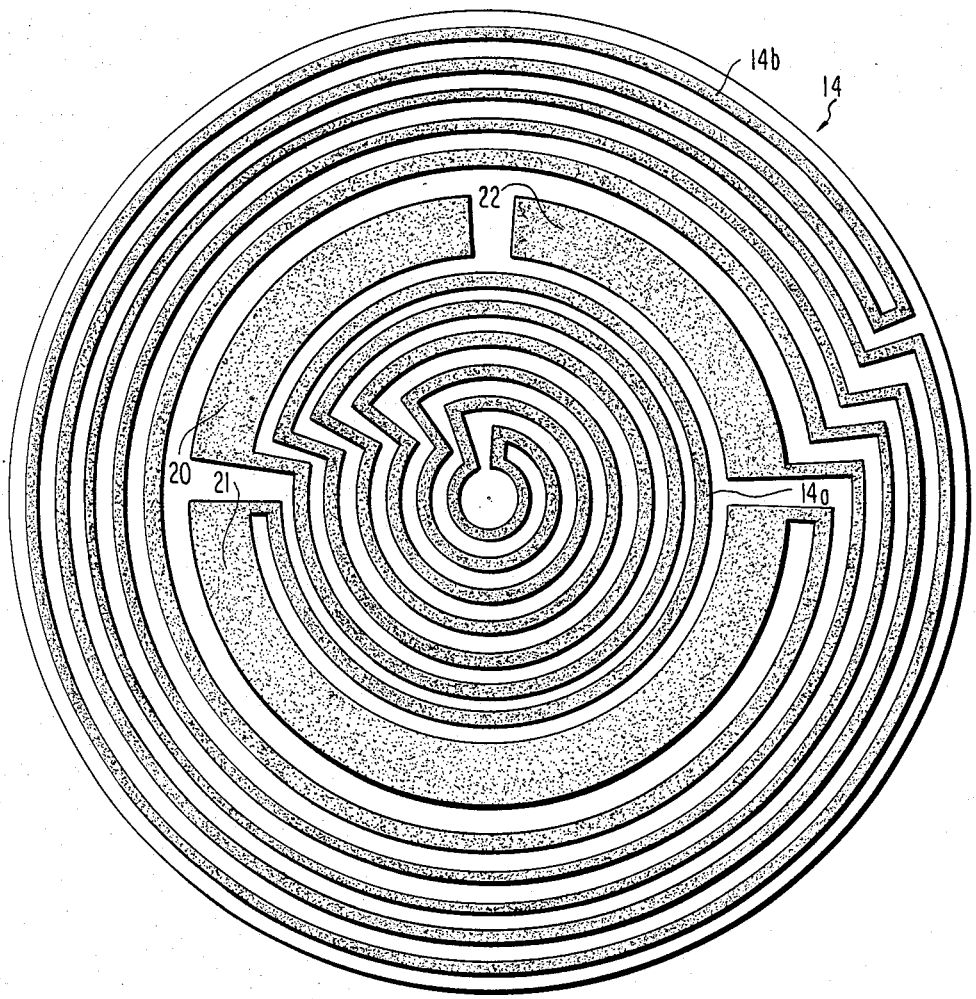
FIG. 2 is an enlarged plan view of a strain gauge of an amorphous metal material.

The pressure sensor 10 as shown in FIG. 1 is provided with an electrical insulating diaphragm 13 which is rigidly mounted between a cap member 11 and the main body 12. A strain gauge 14 of an amorphous metal band plate is positioned on the diaphragm by means of a PVD process such as a sputtering process of the amorphous metal material. The diaphragm 13 is made of a ceramic or glass material and the amorphous metal material is made of $Ni_{68}Si_{15}B_{17}$. An electric circuit board 15 is secured to the main body 12 and is connected to the strain gauge 14 by means of a lead wire 16 and is connected to an external circuit by means of lead wires 17.

In the embodiment of FIG. 2, the pattern of the strain gauge 14 of the amorphous metal band plate comprises a terminal plate 20, an inner vortical strain gauge 14a, an intermediate terminal plate 21, an outer vortical strain gauge 14b and another terminal plate 22. In the absence of pressure, each strain gauge is constructed so as to have substantially the same electrical characteristics. The outer strain gauge 14b is positioned on that part of the diaphragm 13 which is mounted between cap member 11 and the main body 12 with reference to FIG. 1.

The pattern of the strain gauge is formed by means of a photo-etching process which may be either of the following:

(1) According to one process, the amorphous band plate may be formed by means of a sputtering process of the amorphous metal material on diaphragm 13. The photoresist is applied on the amorphous band plate, is exposed using a mask which is formed in accordance with the desired pattern of the strain gauge, and then developed. The photoresist is then baked, etched, eliminated, and the surface thereof cleaned. Such a process results in the desired pattern of the strain gauge 14.

(2) According to a second process, the photoresist is applied on the diaphragm 13 and exposed using a mask to form the desired patterns on the photoresist and then developed. The amorphous band plate is formed by means of a sputtering process of the amorphous metal material. The photoresist is then eliminated and the surface thereof cleaned to make the desired pattern for the strain gauge 14.

FIG. 3 is a circuit diagram for measuring the electrical characteristics of the strain gauge 14 as shown in FIG. 2. A constant voltage supply circuit 30 is connected to a power supply 40 and is comprised of a Zenner diode 31 for absorbing surge current in a voltage regulating IC package 32. A half bridge circuit 50 is comprised of the inner strain gauge 14a and the outer strain gauge 14b. The terminal plate 20 and the terminal plate 22 are connected to the constant voltage supply circuit 30. The intermediate terminal 21 is connected to a non-inverting terminal 61 of an operational amplifier 60. A voltage which is divided by resistors 63, 64, 65, and 66, is applied to an inverting terminal 62 of the operational amplifier 60. When pressure is supplied to inlet port 18 as shown in FIG. 1, the diaphragm is deformed. At this time the strain is applied to the diaphragm 13 and the inner strain gauge 14a. The resistance value of the inner stain gauge 14a changes in response to the impressed strain. The input voltage, which is applied to the non-inverting terminal 61 of the operational amplifier 60, changes in response to the change of the resistance of the strain gauge body 14a and the output of the operational amplifier 60 changes in response to the impressed strain. Since the outer strain gauge body 14b is mounted between the cap member 11 and the main body 12, the resistance value of the outer strain gauge 14b does not change in response to the impressed strain. Therefore, the output of the operational amplifier 60 responds to the change of the resistance value of the inner strain gauge body 14a. In this embodiment, the outer strain gauge 14b acts as a temperature compensator. If the ambient temperature changes, the strain gauge bodies 14a and 14b have the same resistance value change. Therefore, the characteristics of the half-bridge circuit are not affected by the temperature as a whole.

Figure 4:
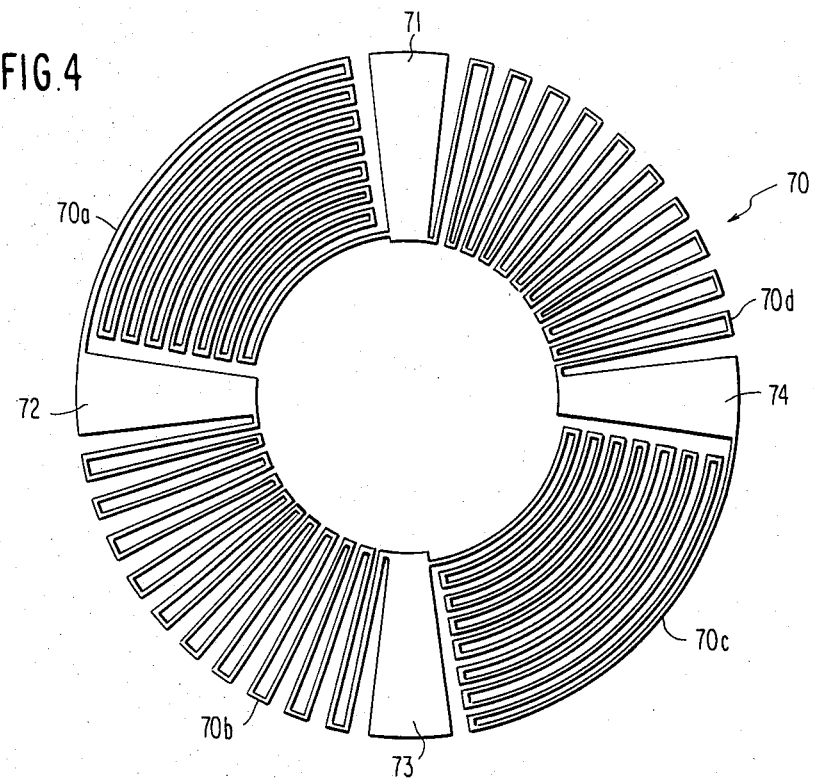
FIG. 4 is an enlarged plan view of a strain gauge of an amorphous metal material in accordance with another embodiment of the present invention.

Another embodiment of the present invention is shown in the strain gauge 70 of FIG. 4. In this embodiment the amorphous band plate is positioned on the diaphragm by means of a sputtering process of the amorphous metal material and the four resistance bodies 70a, 70b, 70c, and 70d, and the four terminal plates 71, 72, 73, and 74, are formed by means of a photoetching process of the amorphous band plate. The resistance bodies 70a and 70c have an overall rectangular configuration and are positioned in the circumferential direction. The resistance bodies 70b and 70d also have an overall rectangular configuration and are positioned in the radial direction. The resistance bodies 70a, 70b, 70c, and 70d, are connected to one another through terminal plates 72, 73, 74, and 71, respectively. The length of each resistance body is the same and each resistance body is constructed so as to have substantially the same electrical characteristics. In this embodiment the resistance bodies 70a, 70b, 70c, and 70d, correspond to the resistance body 14a of the first embodiment.

Figure 5:
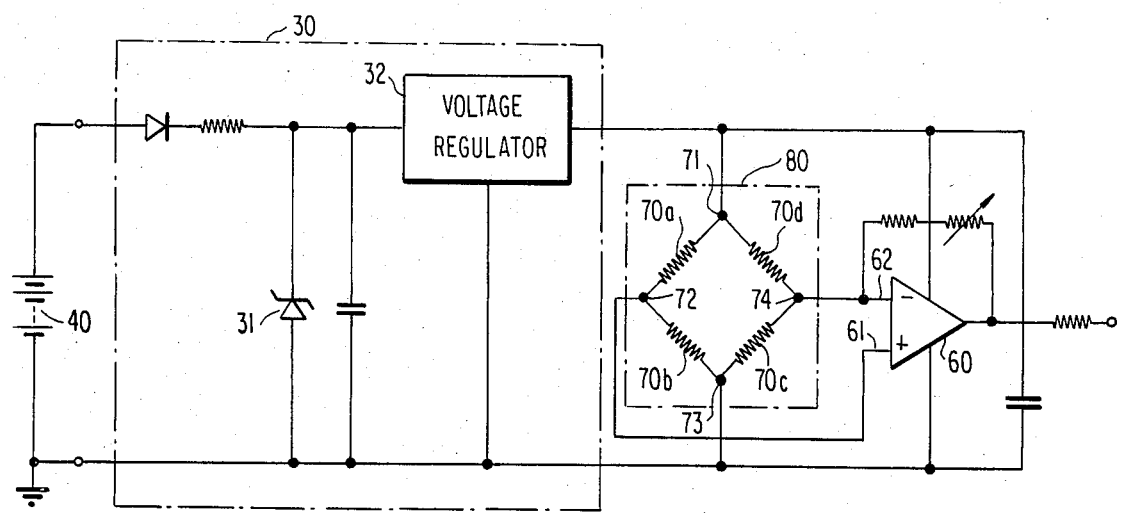
FIG. 5 is a circuit diagram for measuring electrical characteristics of the strain gauge of FIG. 4.

FIG. 5 is a circuit diagram for measuring the electrical characteristics of the resitance bodies. The resistance bodies are connected to one another by means of a bridge circuit 80. The terminal plate 71 between the resistance body 70a and and the resistance body 70d and the terminal plate 73, between the resistance body 70b and the resistance body 70c, are connected to a constant voltage supply circuit 30. The terminal plate 72 between the resistance body 70a and the resistance body 70b, and the terminal plate 74, between the resistance body 70c and resistance body 70d, are connected to the inverting terminal 71 of the operational amplifier 60 and to the noninverting terminal 61 of the operational amplifier 60, respectively. When a constant voltage is supplied between the terminal plate 71 and the terminal plate 73, and no pressure is provided to the inlet port 18, the bridge circuit 80 reaches the equilibrium state and no voltage is generated between terminal plate 72 and the terminal plate 74. Thus, the equilibrium condition of the bridge 80 can be felt. If pressure is supplied to the inlet port 18, strain is applied to the diaphragm 13 and the strain is then impressed on the resistance bodies 70a, 70b, 70c, and 70d. Since the strain applied in the radial direction is higher than the strain applied in the circumferential direction the change of the resistance values of the resistances 70b and 70d becomes greater than that of the resistance bodies 70a and 70c. Accordingly, the equilibrium of the bridge 80 is destroyed and the output voltage which then corresponds to the supplied pressure will be obtained. If the ambient temperature changes, all the resistance bodies will have the same resistance value change and the characteristics of the bridge circuit will not be affected by the temperature as a whole. While in the described embodiment, the amorphous band plate is formed by means of a sputtering process of the amorphous metal material, it is obvious that the amorphous band plate may be formed by means of other PVD processes, for example, an evaporating process or an ion plating process. According to the present invention, the amorphous band plate is formed directly on the diaphragm 13 which is made of insulating material, such as ceramic or glass material. The amorphous band plate, however, may be formed on an insulating material which is formed on the diaphragm which in turn is made of conductive material.

Thus, in the pressure sensor according to the present invention, the amorphous metal material is the means which converts the deformation of the diaphragm into an electrical signal. The amorphous band plate on the diaphragm is formed by means of a PVD process utilizing amorphous metal material and resistance bodies are formed by means of a photoetching process on the amorphous band plate. Accordingly, the pressure sensor is capable of many applications due to the many advantages achieved by using amorphous metal material and a PVD process.

While the invention has been particularly shown and described with reference to preferred embodiments thereof, it will be understood by those in the art that the foregoing and other changes in form and details may be made therein without departing from the spirit and scope of the invention.

What is claimed is:

1. A pressure sensor having a strain gauge for converting fluid pressures into electrical signals comprises a diaphragm adapted to be tensioned under pressure, a casing member supporting said diaphragm and resistance body means of amorphous metal material comprised of nickel, silicon and boron for operating said strain gauge formed on said diaphragm by means of a physical vapor deposition process.

2. A pressure sensor as set forth in claim 1 wherein said amorphous metal material is $Ni_{68}Si_{15}B_{17}$.

3. A pressure sensor as set forth in claim 1 wherein said physical vapor deposition process is a sputtering process.

4. A pressure sensor as set forth in claim 1 wherein said diaphragm is made of insulating material.

5. A pressure sensor according to claim 1 wherein said resistance body means is comprised of a first vortical portion, means for clamping said first vortical portion to said casing member, and a second vortical portion disposed adjacent the center of said diaphragm for sensing strain imparted to said diaphragm and circuit means for providing and electric signal in response to said strain.

6. A pressure sensor as set forth in claim 1 wherein said resistance body means is comprised of two diametrically opposed resistances each having parallel portions extending in a substantially circumferential direction, a pair of diametrically opposed resistances having substantially parallel portions disposed in a substantially radial direction and circuit means including said resistances connected in a bridge circuit for providing an electric signal indicative of strain applied to said resistances.

* * * * *